United States Patent

Stargardter

[15] 3,679,324

[45] July 25, 1972

[54] FILAMENT REINFORCED GAS TURBINE BLADE

[72] Inventor: Hans Stargardter, Bloomfield, Conn.

[73] Assignee: United Aircraft Corporation, East Hartford, Conn.

[22] Filed: Dec. 4, 1970

[21] Appl. No.: 95,232

[52] U.S. Cl. ..........................416/229, 416/230, 416/241 A
[51] Int. Cl. ..........................................................F01d 5/14
[58] Field of Search..................416/229, 230, 224, 241 A

[56] References Cited

UNITED STATES PATENTS

| | | | |
|---|---|---|---|
| 2,929,755 | 3/1960 | Porter | 416/229 |
| 2,175,204 | 10/1939 | Lougheed | 416/230 |
| 2,868,441 | 1/1959 | Reutt | 416/241 A |
| 3,572,971 | 3/1971 | Seiwert | 416/230 |
| 3,571,901 | 3/1971 | Sara | 416/230 |
| 3,368,795 | 2/1968 | Bolin et al. | 416/230 |
| 2,182,812 | 12/1939 | Lougheed | 416/230 |

*Primary Examiner*—Everette A. Powell, Jr.
*Assistant Examiner*—Clemens Schimlkowski
*Attorney*—John D. Del Ponti

[57] ABSTRACT

A filament reinforced gas turbine engine blade having a divergent root defined by a particular splay radius comprising oriented high modulus, high strength nonductile first reinforcing filaments embedded in a matrix and forming a radius of curvature greater than the splay radius and no smaller that its working radius, and oriented high strength ductile second reinforcing filaments embedded in a matrix and forming a radius of curvature which is equal to or less than the splay radius with no loss of strength therein.

6 Claims, 2 Drawing Figures

PATENTED JUL 25 1972 3,679,324
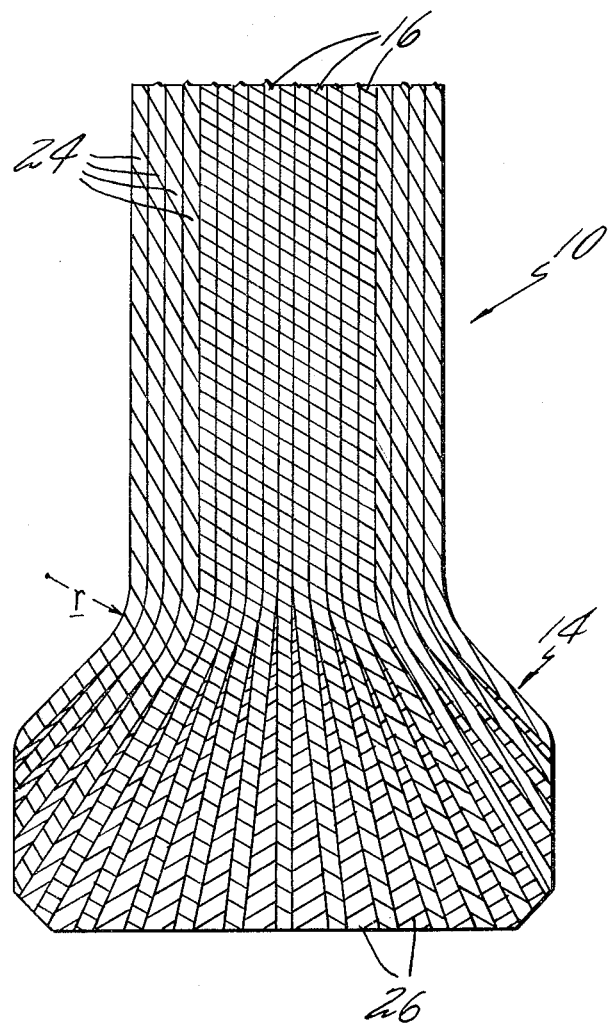
FIG.1
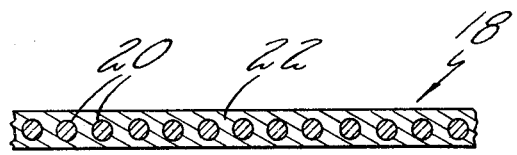
FIG.2
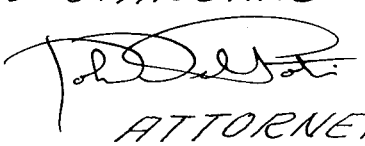
INVENTOR
HANS STARGARDTER
BY
ATTORNEY 3,679,324

FILAMENT REINFORCED GAS TURBINE BLADE

BACKGROUND OF THE INVENTION

This invention relates to a filament reinforced gas turbine engine blade and more particularly relates to a blade formed of unidirectionally reinforced laminations bonded together and having a divergent root.

It is known to utilize filaments in the reinforcement of gas turbine engine components such as compressor blades. In particular, the potential for usage of high modulus high strength, nonductile fibers, such as silicon carbide, carbon, boron, or boron with a thin protective coating of, for example, silicon carbide, in a resin or metal matrix is widely recognized.

One of the basic problems in utilizing filamentary reinforcements in blade structures, particularly in the smaller blades, resides in the means for mounting them in their rotor or stator structure. Typically, a compressor blade requires an enlarged base formed for insertion in the compressor rotor or stator. While the satisfaction of such a requirement in the normal metal blade is difficult from a manufacturing standpoint, as well as expensive, it is accepted as being commercially feasible. Satisfaction of the requirement in a filament reinforced composite has however, been extremely difficult, primarily because of the composite's inherent sensitivity to stresses in the blade root area which act locally either in compression or in shear or both.

In one preferred arrangement, it has been found advantageous to form the blade as a plurality of substantially parallel elongated laminations disposed in a stack one on the other, the laminations including elongated sheets of unidirectional reinforcing filaments embedded in a matrix material and aligned in a spanwise direction, with the lower end of the stack having its laminations splayed outwardly with metallic inserts bonded therebetween to form an enlarged portion extending chordwise of the blade. Such a configuration, however, has a splay radius which is limited as determined by the size and stiffness of the reinforcing filaments since the strength level for filaments as brittle as those under consideration herein is, in general, directly proportional to its bending radius and inversely proportional to the square of the filament radius. As is known, such filaments are basically nonductile and will not plastically deform without breaking or cracking. Filaments of boron, silicon carbide or carbon, for example, exhibit less than 0.5 percent elongation to failure and a reduction of area of essentially zero.

SUMMARY OF THE INVENTION

The present invention contemplates a filament reinforced blade for a gas turbine engine which has a particular splay radius and which uses unidirectional nonductile reinforcing filaments aligned in a spanwise direction which have a working radius of curvature which is larger than the desired splay radius. More particularly, the invention introduces the concept of utilizing unidirectional reinforcing nonductile first filaments embedded in a matrix material and aligned in a spanwise direction, the smallest radius of curvature formed by the first filaments being larger than the splay radius and equal to or greater than their working radius and utilizing unidirectional reinforcing ductile second filaments embedded in a matrix material and aligned in a spanwise direction, the smallest radius of curvature formed by the second filaments being equal to or smaller than the splay radius with no loss of strength therein. In a preferred embodiment of the invention, the nonductile first reinforcing filaments are incorporated into blade forming laminations of elongated sheets and the ductile second reinforcing filaments are incorporated into outer laminations disposed on the blade forming laminations.

By means of the present invention, there is provided an efficient utilization of high modulus, high strength, nonductile filaments in those blades which require a splay radius which is smaller than the working radius of the aforementioned filaments.

BRIEF DESCRIPTION OF THE DRAWING

FIG. 1 is a side elevation view, in section, of a gas turbine engine blade embodying the invention, and FIG. 2 is a cross-sectional view of a monolayer tape useful in the present invention.

DESCRIPTION OF THE PREFERRED EMBODIMENT

In the drawing is shown a blade 10 having a blade portion 12 and a root portion 14. The blade portion is comprised of a plurality of blade forming laminations 16 which are bonded together in a stack. Each lamination is itself comprised of a plurality of sheets 18 of unidirectional reinforcing filaments 20 embedded in a matrix material 22 and aligned in a spanwise direction. As shown in FIG. 2, each sheet is preferably a monolayer tape of high strength, high modulus, nonductile filament such as those made of boron, or other materials as indicated hereinbefore, and embedded in a suitable matrix, such as the high temperature resins, as for example polyimide, polybenzimidazole, polybenzothiozole, polyoxadiazole and the like, the lower temperature resins, as for example epoxy, polyester, phenolic, acrylic and the like, or metals such as aluminum, magnesium, titanium, and their alloys and the like. In general, the filaments are of a material having a modulus of elasticity of at least about $40 \times 10^6$ psi. Further, while each thin sheet layer of the parallel high modulus, high strength filaments and matrix need not be directionally aligned in a spanwise direction, the majority are so oriented in order to stiffen the blade in the direction of its longitudinal axis and substantially increase the bending modal frequency to a level above that of the operating frequencies to be encountered. Some of the sheet layers 18 may be arranged at different angles with regard to the blade longitudinal axis to increase the torsional modal frequency of the blade. As will be appreciated by those skilled in the art, the orientation and combinations of layers may be varied in order to meet the requirements of the particular blade design.

Referring to the drawings, it can be seen that the root portion 14 of the blade 10 is dovetailed and thereby adapted to be received by an axial slot in a rotor in the conventional manner. The dovetail, or splayed root, is defined by a particular splay radius of curvature $r$, which dimension is determined by various known factors, not particularly related to the size and stiffness of the filaments 20, to achieve proper dovetail footing. As indicated above, a preferred method of forming the root portion of a blade formed of a plurality of filament reinforced sheet layers, laminated together is to splay the lower ends of the laminations outwardly from the longitudinal axis of the blade and to maintain them thusly by bonding metallic, wedge-shaped inserts 24 therebetween. As will be appreciated, the amount of splay assumed by the outermost sheets 16 having filaments 20 oriented in a spanwise direction is limited to what may conveniently be called the working radius of curvature of that particular filament or larger. In other words, the smallest radius of curvature assumed by the blade-forming laminations 16 must be equal to or greater than the working radius of curvature of the reinforcing filaments 20. The working radius for a filament will be defined as the smallest radius over which that filament may be bent elastically and still retain sufficient strength to withstand, on a continuing basis, normal expected operational loads of, for example, centrifugal gas bending forces and fatigue.

With respect to the working radius of various filaments in different applications, the following is considered illustrative. Commercially available boron filament, formed by depositing substantially pure boron onto a 0.0005 inch diameter tungsten wire core, has an overall diameter of about 0.004 inch. The filament typically has an average tensile strength of 400,000 psi and a modulus of elasticity of $60 \times 10^6$ psi. When forced over a ½ inch radius, this filament suffers a reduction in strength of approximately 50 percent. In other words, the available working strength in a 4 mil boron filament having a radius of curvature of ½ inch is approximately 200,000 psi. Thus if the working strength necessary from this particular filamentary material is 200,000 psi, the working radius is considered to be ½ inch.

The following table illustrates the degree of strength loss for nonductile filaments having an average tensile strength of 400,000 psi and a modulus of $60 \times 10^6$ psi as related to filament radius and to the radius of curvature of the filament. The tabulations are based on the fact that for nonductile filaments, the induced stress is directly proportional to the radius of curvature and inversely proportional to the square of the filament radius.

TABLE

| Bend Radius (inches) | Filament Diameter (inches) | Working Strength (psi) |
|---|---|---|
| .15 | .001 | 200,000 |
| .30 | .002 | 200,000 |
| .45 | .003 | 200,000 |
| .60 | .004 | 200,000 |
| .75 | .005 | 200,000 |
| .90 | .006 | 200,000 |
| 1.05 | .007 | 200,000 |
| 1.20 | .008 | 200,000 |
| 1.35 | .009 | 200,000 |
| 1.50 | .010 | 200,000 |

In accordance with the invention, with the working radius of the filament 20 being less than the required splay radius, it has been found that the incorporation of a second type of filamentary reinforcing material which can be bent to at least the required splay radius without degrading below its working strength will result in a dovetail composite blade wherein the advantages of the dovetail are retained while, at the same time the disadvantages of laminated materials, including the tendency to cleave along their plane of lamination, are avoided.

A plurality of laminations 24 are bonded together and to each side of the blade forming laminations 16. As shown, they are gradually splayed outward with the surface laminations forming the splay radius r of the root 14. Each lamination 24 is comprised of a plurality of sheets generally identical to the sheets 18 except that the reinforcing filaments are made of a material different than the high stiffness material making up the filaments 20. Preferably, the second reinforcing filaments are comprised of a relatively ductile material such as steel, titanium or the like which can be plastically deformed without substantial loss of strength. These filaments can be formed over a tight radius, deforming permanently in the plastic regime without cracking or rupturing, while retaining essentially all of their elastic strength and stiffness.

In one embodiment of the present invention, a structure having a splay radius of 0.15 inch may be produced. Monolayer tapes of 400,000 psi strength 4 mil Borsic filament in an aluminum matrix, prepared according to the teachings of co-pending application Ser. No. 763,278, filed Sept. 27, 1968 and assigned to the same assignee as the present invention, are bonded together in a stack by hot pressing to form a central blade-like portion as shown in FIG. 1. Wedges 26 made of aluminum are inserted between every 15 plies of tape, although inserts may be used satisfactorily every 10 to 20 plies, to splay the blade-forming laminations 16 and Borsic filaments 20 to a minimum radius of curvature of 0.50 inch. In order to achieve the desired root configuration, a plurality of outer laminations of filamentary steel reinforced aluminum tapes are bonded over the root portion to achieve the 0.15 inch splay radius. The steel filaments are preferably 4 mil stainless steel piano-type wire commercially available at high tensile strengths although 4 mil titanium wire is also considered satisfactory.

What has been set forth above is intended primarily as exemplary to enable those skilled in the art in the practice of the invention and it should therefore be understood that, within the scope of the appended claims, the invention may be practiced in other ways than as specifically described.

What is claimed is:

1. A filament reinforced gas turbine engine blade having a divergent root portion having a particular splay radius comprising:

high modulus, high strength, nonductile inner reinforcing filaments embedded in a matrix material and aligned in a spanwise direction in the blade portion and diverging outwardly in the portion, the smallest radius of curvature formed by said inner filaments in said root portion being greater than said splay radius but not smaller than its working radius; and high strength ductile outer reinforcing filaments embedded in a matrix material and aligned in a span-wise direction in the blade portion and diverging outwardly in the root portion, said outer filament-reinforced matrix material being bonded to said inner filament-reinforced matrix material, the smallest radius of curvature formed by said outer filaments being equal to said splay radius with essentially no loss of strength therein.

2. The blade of claim 1 wherein said inner reinforcing filaments are selected from the group consisting of boron, carbon, silicon carbide and silicon carbide coated boron.

3. The blade of claim 2 wherein said outer reinforcing filaments are selected from the group consisting of steel or titanium or alloys thereof.

4. A filament reinforced gas turbine engine blade having a splayed root being defined by a particular splay radius comprising:

a plurality of substantially parallel elongated blade forming laminations disposed in a stack one on the other, one end of the stack having its laminations flaring centrally outwardly to form an enlarged inner root portion extending chordwise of the blade;

said blade forming laminations including elongated sheets of high modulus, high strength, nonductile first reinforcing filaments embedded in a matrix material and aligned in a spanwise direction, the smallest radius of curvature formed by said blade forming laminations being greater than said splay radius but not smaller than the working radius of said first reinforcing filaments;

a plurality of substantially parallel outer laminations disposed in a stack on each side of said blade forming laminations, the outer laminations covering said one end of the blade forming laminations and being flared outwardly to form the outer portion of said root;

said outer laminations including sheets of ductile second reinforcing filaments embedded in a matrix material and aligned in a spanwise direction, said second reinforcing filaments being formed to a minimum radius of curvature which is equal to said splay radius with essentially no loss of strength; and a plurality of inserts disposed between said flaring blade-forming and outer laminations and bonded thereto to maintain the laminations in flaring relation.

5. The blade of claim 4 wherein said first reinforcing filaments are selected from the group consisting of boron, carbon, silicon carbide, and silicon carbide coated boron.

6. The blade of claim 5 wherein said second reinforcing filaments are steel or titanium or alloys thereof.

* * * * *

PO-1050
(5/69)

UNITED STATES PATENT OFFICE
CERTIFICATE OF CORRECTION

Patent No. 3,679,324         Dated   July 25, 1972

Inventor(s)  Hans Stargardter

It is certified that error appears in the above-identified patent and that said Letters Patent are hereby corrected as shown below:

Claim 1, line 15, column 4         after "the" (first occurrence)

insert --root--.

Signed and sealed this 6th day of March 1973.

(SEAL)
Attest:

EDWARD M. FLETCHER, JR.            ROBERT GOTTSCHALK
Attesting Officer                  Commissioner of Patents